United States Patent
Persson (10) Patent No.: US 7,331,172 B2
(45) Date of Patent: Feb. 19, 2008

(54) METHOD FOR THE REGENERATION OF A PARTICLE FILTER, AND A VEHICLE IN WHICH SUCH A METHOD IS UTILIZED

(75) Inventor: Per Persson, Partille (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 10/904,369

(22) Filed: Nov. 6, 2004

(65) Prior Publication Data

US 2005/0172617 A1    Aug. 11, 2005

Related U.S. Application Data

(63) Continuation of application No. PCT/SE03/00639, filed on May 7, 2003, now abandoned.

(30) Foreign Application Priority Data

May 7, 2002    (SE) .................................. 0201410

(51) Int. Cl.
*F01N 3/00*    (2006.01)
(52) U.S. Cl. ............................ 60/295; 60/274; 60/286; 60/297; 60/311
(58) Field of Classification Search .................. 60/274, 60/285, 286, 295, 297, 300, 311, 303
See application file for complete search history.

(56) References Cited

U.S. PATENT DOCUMENTS

| | | | |
|---|---|---|---|
| 4,902,487 A | 2/1990 | Cooper et al. | |
| 5,146,890 A | 9/1992 | Gobert et al. | |
| 5,564,385 A | 10/1996 | Hakansson | |
| 5,887,434 A | 3/1999 | Arnell et al. | |
| 5,894,731 A | 4/1999 | Hakansson | |
| 6,085,524 A | 7/2000 | Persson | |
| 6,294,141 B1 | 9/2001 | Twigg et al. | |
| 6,594,990 B2 * | 7/2003 | Kuenstler et al. | 60/295 |
| 6,622,480 B2 * | 9/2003 | Tashiro et al. | 60/295 |
| 6,634,170 B2 * | 10/2003 | Hiranuma et al. | 60/295 |
| 6,843,055 B2 * | 1/2005 | Ootake | 60/297 |

FOREIGN PATENT DOCUMENTS

| | | | |
|---|---|---|---|
| JP | 2002-097986 | * | 4/2002 |
| JP | 2002097986 A2 | | 4/2002 |

* cited by examiner

*Primary Examiner*—Thomas Denion
*Assistant Examiner*—Diem Tran
(74) *Attorney, Agent, or Firm*—Novak Druve + Quigg, LLP (57) ABSTRACT

A system and method for the regeneration of a particle filter (13) arranged downstream from a catalyzer unit (14) in an exhaust canal (10) arranged to an internal combustion engine (2), where the internal combustion engine (2) is arranged to assume a first operational mode (60) in which a driving torque is emitted and a second operational mode (80) constituting engine braking where the internal combustion engine (2) supplies compression work to a gas mixture which flows through the exhaust canal (10) without a corresponding expansion work having been emitted from the gas mixture, and a vehicle where the method is utilized.

19 Claims, 8 Drawing Sheets

METHOD FOR THE REGENERATION OF A PARTICLE FILTER, AND A VEHICLE IN WHICH SUCH A METHOD IS UTILIZED

CROSS-REFERENCE TO RELATED APPLICATIONS

The present application is a continuation patent application of International Application No. PCT/SE03/00639 filed 7 May 2003 now abandoned which was published in English pursuant to Article 21(2) of the Patent Cooperation Treaty, and which claims priority to Swedish Application No. 0201410-8 filed 7 May 2002. Said applications are expressly incorporated herein by reference in their entireties.

TECHNICAL AREA

The present application relates to a method for the regeneration of a particle filter arranged in an exhaust pipe attached to an internal combustion engine.

TECHNICAL BACKGROUND

In the combustion process of diesel engines, apart from water steam, nitrous oxides and carbon dioxides soot particles are also formed. In order to reduce the exhaust (release into the atmosphere) of soot particles, a particle trap can be arranged in the exhaust channel. The soot particles are caught in the particle trap, by means of which the exhaust gases are purified. As an example, EP 341 832 (equivalent to U.S. Pat. No. 4,902,487) describes a system having a filter in which soot particles are caught.

The soot particles are then incinerated in an ambience of nitrous dioxide. The nitrogen dioxide is formed from the exhaust gases from nitrogen monoxide in an oxidization catalyzer that is arranged upstream from the filter. A problem with the system described in is that its capacity for transforming the soot particles to carbon dioxide is low when operational conditions are producing low exhaust gas temperatures. This means that the regeneration of the particle filter will take too much time or, where applicable, will not be sufficient. This can lead to the filter gradually becoming blocked with an associated, increasing, fall in pressure as a consequence. This, in turn, means that the filter needs to be serviced often.

SUMMARY OF THE INVENTION

An object of the invention is to provide a method for the regeneration of a particle filter with a high degree of transformation. According to the preferred method, an injection unit arranged at the internal combustion engine provides fuel to an exhaust gas system arranged in the internal combustion engine at an operational point in time when the internal combustion engine is operated in an operational mode corresponding to engine braking, with the temperature of the gas mixture in the exhaust gas canal rising. A catalyzer unit arranged in the exhaust gas canal in thermic connection to the particle filter is exposed to the fuel supplied which is oxidized, with the result being that the soot particle filter is heated to such a temperature that soot particles are transformed into carbon dioxide under reaction with oxygen comprised in the exhaust gases. The injection unit can consist of a separate unit which exhibits an injector placed in the exhaust gas canal, or by the existing injection system of the internal combustion engine.

The invention capitalizes on the fact that the exhaust gas temperature during engine braking is higher than during normal operation. As an example, it can be stated that the exhaust gas temperature downstream from an exhaust gas temperature and low load is approximately 200° C., at medium load approximately 300° C. and at high load 400° C. The temperature downstream from the turbine during engine braking can be up to approximately 500° C., depending on which effect that is absorbed by the engine braking.

For oxidization of carbon particles according to the formula $C+O_2 =>CO_2$ to take place, an ambient temperature of approximately 600° is necessary. This temperature is obtained by means of injection of fuel to one or several of the combustion chambers, with fuel passing through the combustion chamber out through the exhaust gas canal in an unused state. Alternatively, fuel can be injected directly into the exhaust gas system through a separately arranged injection unit. The fuel is then oxidized by contact with the oxidation catalyzer which is placed upstream from the filter, and by means of which the reaction energy that has developed heats the filter to an ignition temperature for oxidation of carbon particles according to the process $C+O_2 =>CO_2$.

As an engine brake, all systems can be used where the internal combustion engine supplies compression to a gas mixture flowing through the exhaust gas canal without a corresponding expansion work which has been emitted from the gas mixture being utilized. Examples of such systems are described in SE 466 320, SE 470 363, SE 502 614, SE 502 914 and SE 512 484 with their respective US equivalents being U.S. Pat. No. 5,146,890, U.S. Pat. No. 5,564,385, U.S. Pat. No. 5,894,731, U.S. Pat. No. 5,887,434 and U.S. Pat. No. 6,085,524, each of which is hereby expressly incorporated herein by reference for purposes of disclosure.

In a preferred embodiment, the fuel is supplied by means of injectors arranged at the combustion chambers of the internal combustion engine. The fuel is supplied as stated above when a control unit has assumed an operational mode in which the engine brake has been activated, and at such a stage that the fuel is allowed to pass the combustion chamber into the exhaust canal in a non-spent or only partially spent state. This is obtained by supplying the fuel at a delayed crank-angle position relative to a normal injection; that is, during the expansion stroke or later. This delayed crank-angle position corresponds to 90° after the upper dead point if an exhaust gas pressure regulator is utilized, and 30° after the upper dead point if an exhaust gas brake is utilized as described in SE 466 320.

In another preferred embodiment, the invention relates to a vehicle in which such a method as described above is employed.

DESCRIPTION OF THE FIGURES

The invention will be described below in more detail with reference to the appended drawings, in which.

DETAILED DESCRIPTION

Figure 1:
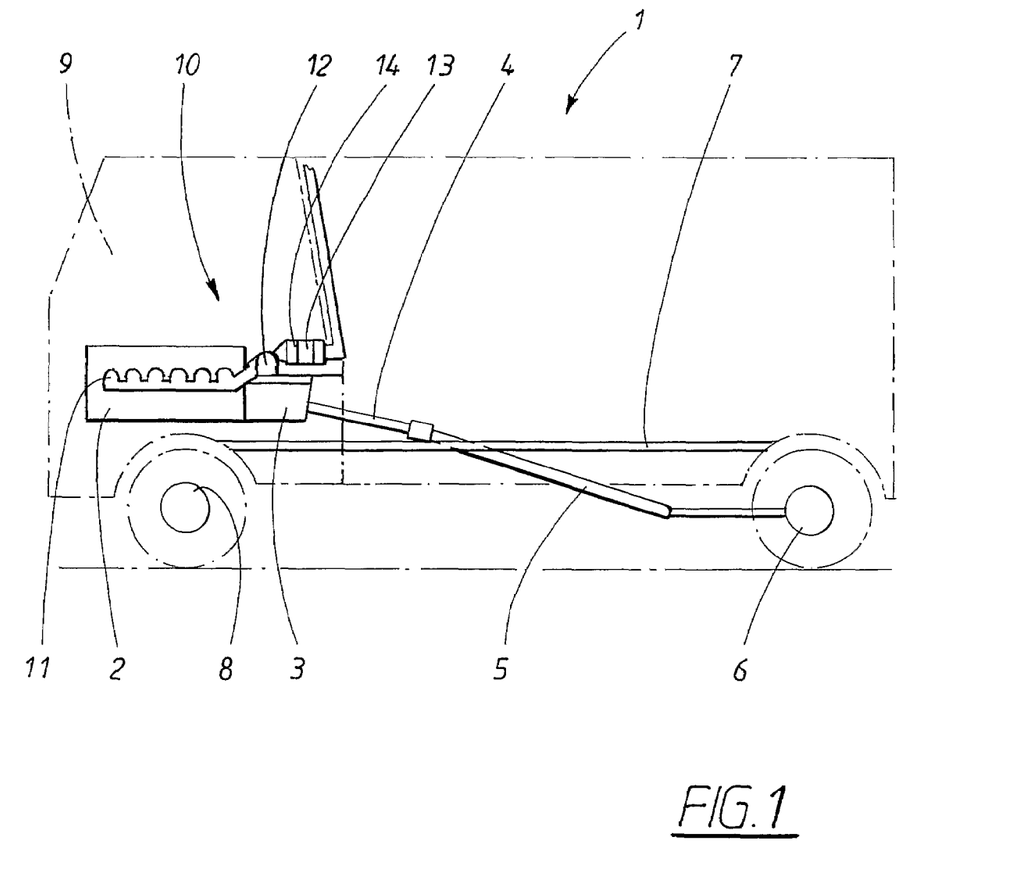
FIG. 1 is a schematic view showing a vehicle that includes an internal combustion engine equipped with a particle filter which is regenerated by means of a method conducted according to the present invention.

FIG. 1 shows a vehicle 1 that is equipped with an internal combustion engine 2 and a gear box 3 attached to the internal combustion engine 2. The gear box 3 exhibits an outwards going driving shaft 4, which, via a cardan shaft 5, drives at least a pair of drive wheels 6. The vehicle 1 is, in a conventional manner, designed around a frame 7 supported by the driving wheels 6 and preferably, also a set of steerable wheels 8. The vehicle 1 preferably comprises (includes, but is not necessarily limit to) a cabin 9.

The internal combustion engine 2 is in a conventional manner equipped with an exhaust system 10 that includes an exhaust manifold 11 attached to the outlets of the internal combustion engine 2. In the exhaust system 10, there is preferably a turbine 12 arranged, and which preferably is comprised in a turbo aggregate and is thus mechanically attached to a compressor arranged on the inlet side of the internal combustion engine (not shown), or alternatively is mechanically fed back to the driving shaft of the internal combustion engine in a turbo compound system.

The exemplified internal combustion engine is of the diesel type, which means that soot particles are formed during the combustion process. The exhaust system is correspondingly equipped with a particle filter 13 which is arranged in the exhaust system 10. An oxidation catalyzer 14 is arranged in thermic connection with the particle filter. In this context, the terminology of "thermic connection" is utilized to mean that the reaction which takes place in the oxidation catalyzer is able to heat the particle filter. To this end, the oxidation catalyzer is usually arranged upstream and in close proximity to the particle filter, but it is also possible to integrate the particle filter and the oxidation catalyzer on a common supporting structure where the catalyzer material is distributed on the filtering body.

The oxidation catalyzer and the particle filter can preferably be shaped as is described in EP 341 832 or EP 835 684, the US equivalents to which are U.S. Pat. Nos. 4,902,487 and 6,294,141, respectively, and which are hereby expressly incorporated herein by reference for purposes of disclosure.

Soot particles are trapped in the particle filter 13. In the oxidation catalyzer, there is a continuous transformation of nitrogen oxide NO to nitrogen dioxide $NO_2$. A continuous oxidation of the soot particles then takes place in the nitrogen dioxide ambience, with the soot particles being oxidized to carbon dioxide during any, some, or all of the processes $NO_2+C=>NO+CO$, $NO_2+C=>\frac{1}{2}N_2+CO_2$, or $2NO_2+C_2NO+CO2$. Due to the relatively low amount of $NO_x$, in particular $NO_2$, these processes are too slow to completely regenerate the filter at low temperatures and/or low engine load. Even a disrupted function of the $NO_2$ formation due to, for example, sulphur poisoning, will bring about an impeded soot combustion.

Figure 2:
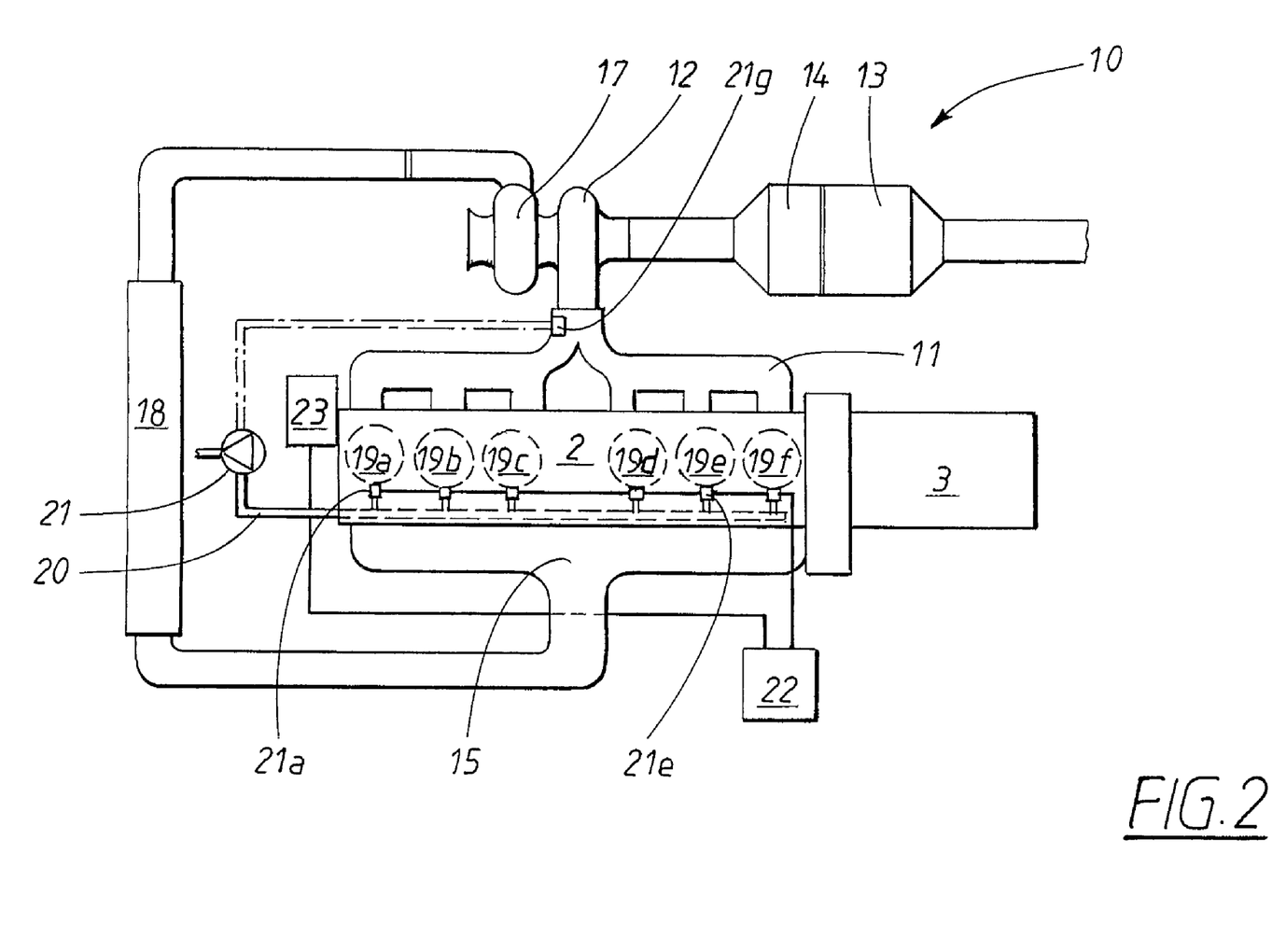
FIG. 2 is a schematic view showing an internal combustion engine equipped with a particle filter and a device for carrying out engine braking.

FIG. 2 shows in greater detail an internal combustion engine 2 which is arranged for the regeneration of a particle filter according to the invention.

The internal combustion engine is, in a conventional manner, attached to a gear box 3. The internal combustion engine 2 exhibits an inlet casing 15 which is attached both to the inlets (not shown) of the internal combustion engine and to an inlet canal 16. The inlet canal 16 preferably exhibits a compressor 17 which preferably is attached to a turbine 12 comprised in a turbo aggregate. Where applicable, a load air cooler 18 can be arranged in the inlet canal.

The internal combustion engine 2 further exhibits an exhaust system 10 which is attached to the outlets (not shown) of the internal combustion engine. The exhaust system comprises an exhaust manifold 11, and downstream from the manifold 11 there is arranged an exhaust turbine 12.

Furthermore, a particle filter 13 and an oxidation catalyzer are arranged in the exhaust canal 10. In the example of an embodiment shown, the oxidation catalyzer 14 is separated from, and arranged upstream from the particle filter 13. In an alternate embodiment, it is possible to arrange the oxidation catalyzer and the particle filter on the same supporting body. In the illustrated example, the internal combustion engine consists of a straight six-cylinder engine and comprises six cylindrical combustion chambers 19a-19f. In a conventional manner, the combustion chambers are supplied with fuel. In the example shown, use is made of so-called common rail injection where a fuel conduit 20, by means of a pump 21, feeds fuel under high pressure to the valves 21a-21f which are controlled by means of a control unit 22 to be opened and closed, respectively. The control unit 22 is of a conventional kind, and is arranged to execute the injection of a certain amount of fuel at a certain crank-angle position, for example by controlling the crank-angle position when opening the respective valves 21a-21f and controlling the injection time for each valve. The invention can be utilized in internal combustion engines with other kinds of fuel feed, for example if use is made of unitary injectors.

The internal combustion engine 1 also exhibits members 23 that are used for generating an engine braking effect. The term engine braking effect means that the internal combustion engine supplies compression work to a gas mixture which flows through the exhaust canal during the compression or exhaust stroke without a corresponding expansion work having been emitted from the gas mixture during the expansion or inlet stroke.

The engine braking effect can be obtained in an arbitrary manner known to the man skilled in the field, for example as has been described in any of SE 466 320, SE 470 363, SE 502 614, SE 502 914 and SE 512 484. The invention functions best when the engine braking effect raises the exhaust gas temperature at the oxidation catalyzer to at least 250° C., and preferably to at least 450° C. If there is a turbine arranged in the exhaust canal, the exhaust gas temperature downstream of the turbine, when injecting fuel, should be at least 250° C., preferably at least 450° C.

In an alternate embodiment suggested by means of dashed lines in FIG. 2, fuel is supplied directly to the exhaust canal 10 via a separate injection unit 21g arranged in connection with the exhaust canal. The injection unit 21g exhibits a nozzle which terminates in the exhaust canal.

Figure 3:
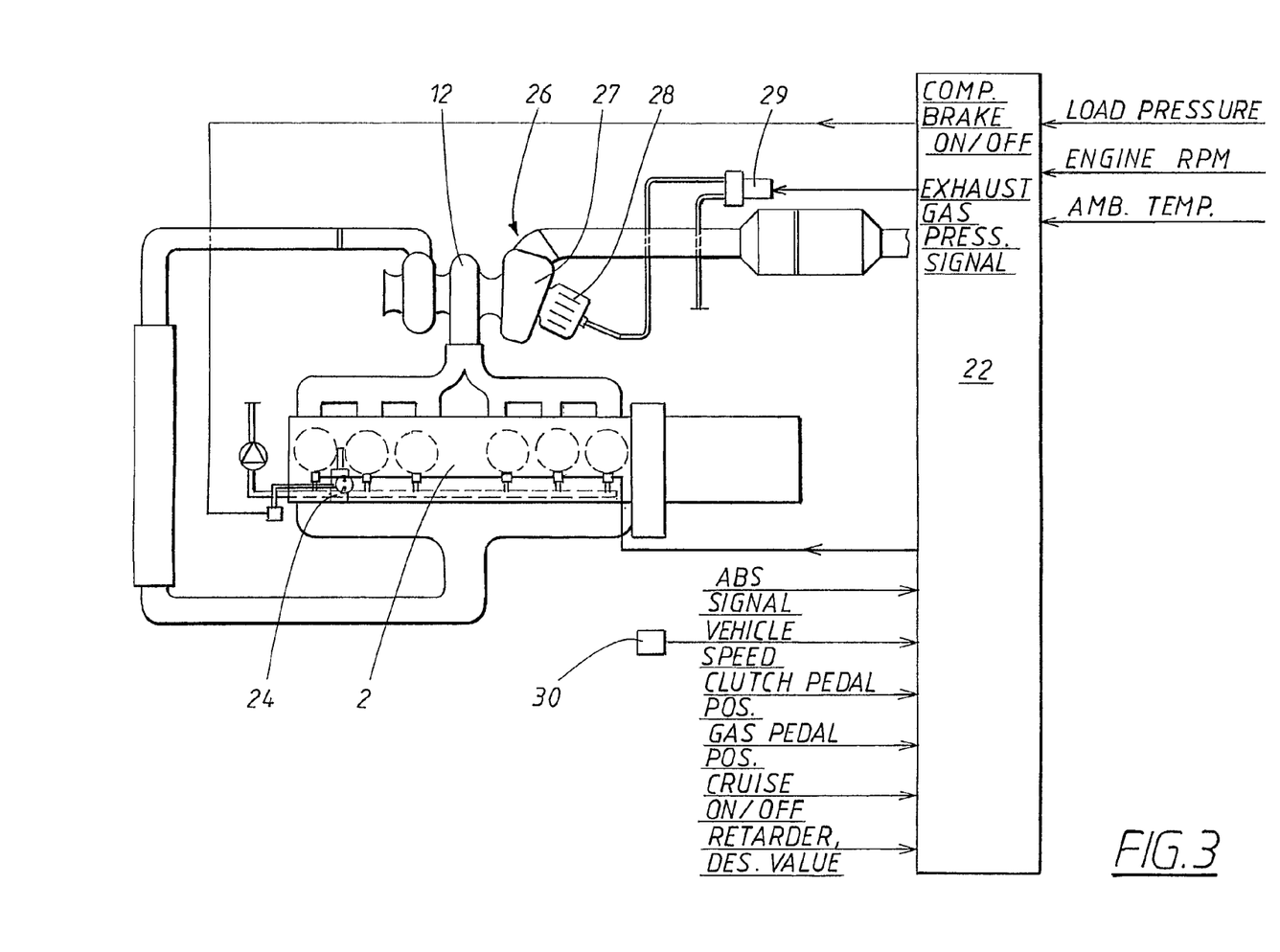
FIG. 3 is a schematic view showing an internal combustion engine equipped with a particle filter and a device for carrying out engine braking and which includes an exhaust gas pressure regulator for variable setting of the engine braking effect.

FIG. 3 demonstrates an embodiment of the invention in which the member or device 23 described with respect to FIG. 2 for generating an engine braking effect comprises an exhaust gas pressure regulator. Most of the corresponding details of the embodiment of FIG. 3 have been described in connection to FIG. 2, and therefore only details which have not already been described will be described below.

The internal combustion engine 2 exhibits a schematically suggested compression braking device 24 which is comprised in the member 23 for engine braking. In certain embodiments of the invention, use is made of a compression braking device 24 of the kind which is described in SE 466 320 which has also been partially described in connection to FIG. 4. This compression braking device 24 enables the cylinders of the engine to, during the later part of the inlet stroke and during the later part of the compression stroke, to be connected with the exhaust manifold of the engine in order to increase the engine braking effect.

In addition, the outlet 25 of the exhaust turbine 12 terminates in an exhaust gas pressure regulator generally designated with the reference numeral 26, which can be of a known kind and comprise a throttle casing 27 having a (not shown) throttle and a pneumatic control device 28 connected to the throttle which, via a control valve 29, is in connection with a source of pressurized air, for example the pressure tank of the engine braking system. Through the control means, the throttle can be adjusted between a completely open and an active position, where a certain exhaust gas pressure is defined by the interaction of the throttle with the gas coming through.

The control unit 22, which preferably takes the form of a microprocessor, provides output signals for the switching on and off, respectively, of the compression braking device 24, and for the adjustment of the exhaust gas pressure regulator choke 26 depending on engine and vehicle data which are input to the control unit from sensors which are as such known, for example a speedometer 30. As indicated in FIG. 2, the input to the control unit is signals which represent the load pressure, the engine speed (rpm) and ambient temperature as engine data. Signals that represent ABS on/off, vehicle speed, clutch pedal position, throttle pedal position, cruise control on/off and the retardation level constitute vehicle data.

For a description of the function of the adjustable engine braking level reference is made to SE 502 614 which is hereby expressly incorporated by reference herein, in its entirety, for purposes of disclosure.

In an alternate embodiment, the exhaust gas pressure regulator can be replaced by an exhaust gas turbine with adjustable turbine geometry to control the exhaust gas counter pressure.

Figure 4:
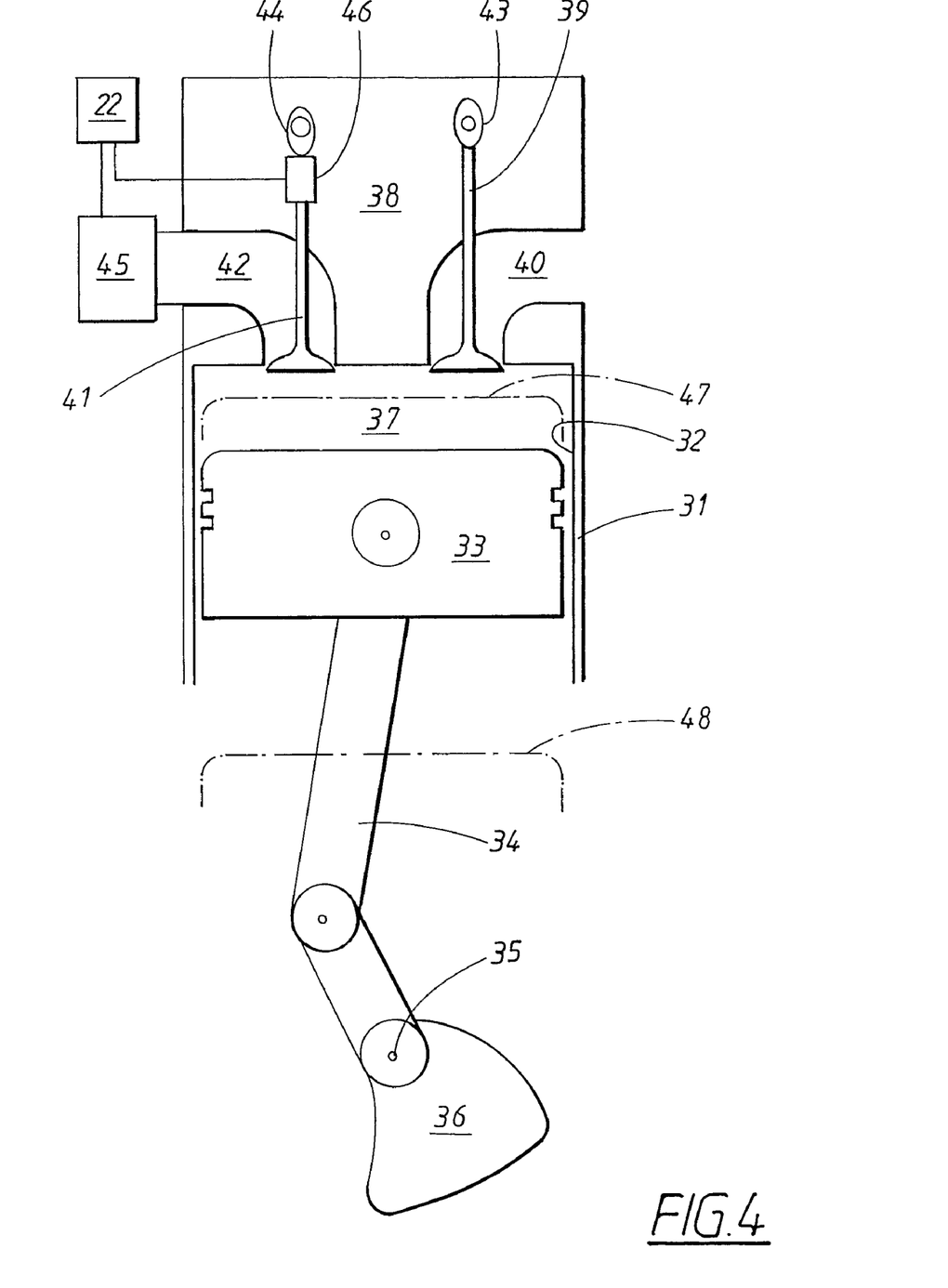
FIG. 4 is a schematic view showing a piston arranged in a cylinder and a variably adjustable exhaust gas valve for bringing about engine braking.

FIG. 4 schematically shows a combustion chamber equipped with a compression braking device 24. The figure schematically shows a four-stroke internal combustion engine with a compression braking device. The internal combustion engine comprises an engine block 31 with a cylinder 32 which houses a piston 33, which by means of a piston rod 34 is connected to a crankshaft 35. A counterweight 36 in a conventional manner balances the crankshaft and thereby reduces the presence of vibrations in the engine.

Above the piston 33 in the cylinder 32, there is a combustion chamber 37 which is closed with a cylinder head 38. In the cylinder head 38, there is an inlet valve 39 which regulates the connection between the combustion chamber 37 and an inlet canal 16 connected to an inlet port 40. The cylinder head 38 furthermore houses an exhaust valve 41 which regulates the connection between the combustion chamber 37 and an exhaust system 10 connected to an exhaust port 42. For the control of the exhaust valve 41 and the inlet valve, camshafts 43 and 44 are respectively provided.

In an alternate embodiment, the valves can be directly electronically controlled, for example by means of electromagnetic actuators. In order to obtain the engine braking effect, there is a throttle member 45, preferably in the form of a throttle arranged in a throttle housing 27. The throttle member or choke 45 is controlled by the control unit 22, which is also utilized for an adjustment member or device 46 which, when influenced, alters the engagement relationship between the camshaft 44 and the valve mechanism for the control of the exhaust valve 41.

Furthermore, FIG. 4 schematically shows the position of the piston 33 and the upper and lower dead points 47, 48. The piston 33 is, as described above, connected via a piston rod 34 to a crankshaft 35 arranged in the internal combustion engine 2, and thus adjustable between an upper and a lower dead point while bringing about a rotational movement of the crankshaft 35.

For a more detailed explanation of how the engine braking effect is obtained reference is made to SE 466 320.

Figure 5:
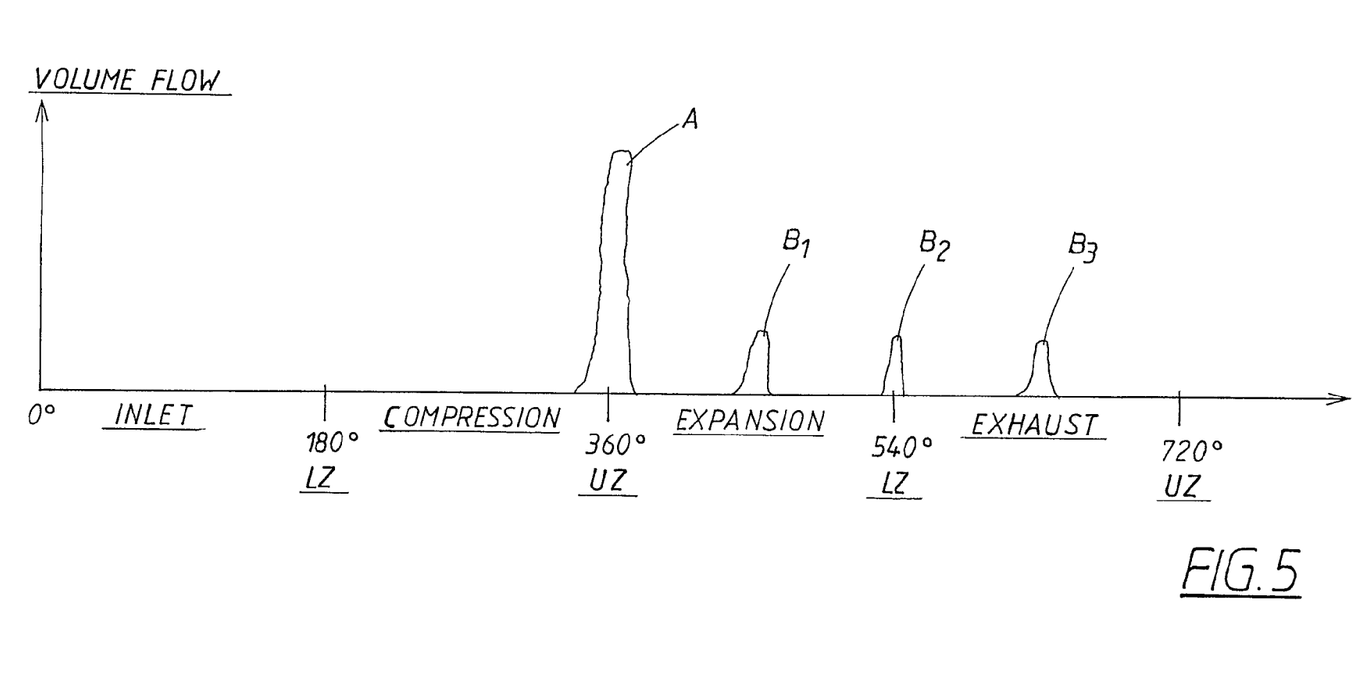
FIG. 5 is a graphical representation showing the volume flow of injected fuel amount during normal operation and during engine braking during regeneration.

FIG. 5 schematically shows the volume flow of the injected fuel amount under normal operation and during engine braking during regeneration. The control of the amount of fuel injected and the angular position of the crankshaft during injection is controlled by the control unit in a manner known to the man skilled in the art. An example of a control unit for vehicles is shown in SAE J1939/71, 1996 which is hereby expressly incorporated by reference for purposes of disclosure. The diagram shows the volume flow as a function of the crankshaft angle position, which is indicated with the lower and upper dead point of the piston as reference points. Along the X-axis, the four strokes of the internal combustion engine are shown; the inlet stroke between 0° and 180°, the compression stroke between 180° and 360°, the expansion stroke between 360° and 540° and the exhaust stroke between 540° and 720°.

Curve A shows the fuel amount supplied in an operational case where the engine operates in normal operational mode for delivering a torque. Fuel is then supplied at a transition between the compression and the expansion stroke with a duration of between 3°-30° crankshaft angle degrees.

Curves $B_1$-$B_3$ show the supplied fuel amount during engine braking for regeneration of a particle filter arranged downstream from an oxidation catalyzer in the exhaust canal. The fuel is preferably supplied during the expansion stroke or the exhaust stroke in an interval between 30° and 90° after the upper dead point between compression stroke and expansion stroke. A further interval comprising 0°-360° after the upper dead point between the compression stroke and the expansion stroke is possible, that is during the expansion stroke and the exhaust stroke.

In the embodiments $B_1$ and $B_2$, fuel is supplied between 30° and 180° after the upper dead point between the compression stroke and the expansion stroke.

In the illustrated embodiment $B_3$, fuel is supplied at 270° after the upper dead point.

Figure 6:
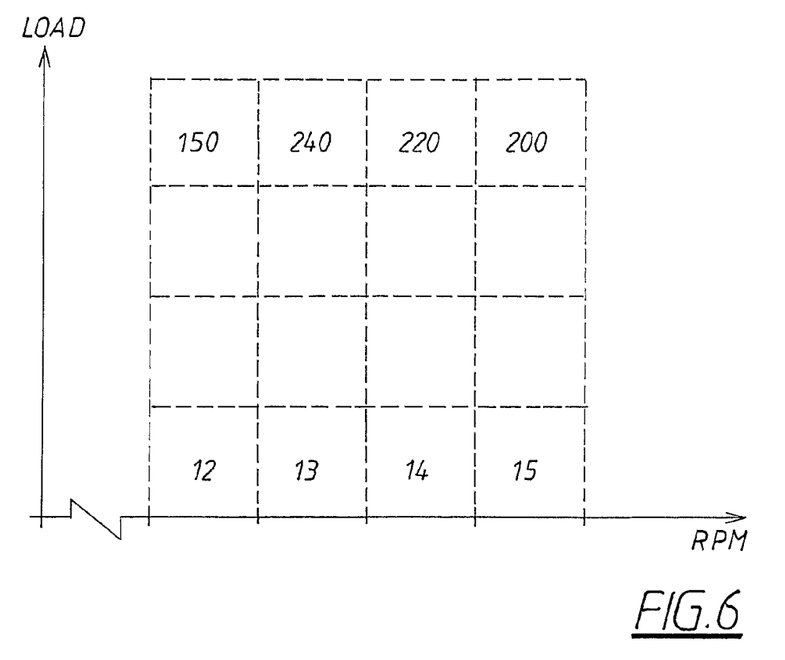
FIG. 6 demonstrates a matrix used for determining the fuel amount injected during normal operation.

FIG. 6 shows an example of matrix-shaped images for determining the amount of fuel injected depending on load and rpm when the internal combustion engine operates in normal operational mode. The control unit 22 comprises a memory area (not shown) in which a matrix of this form is stored.

Figure 6A:
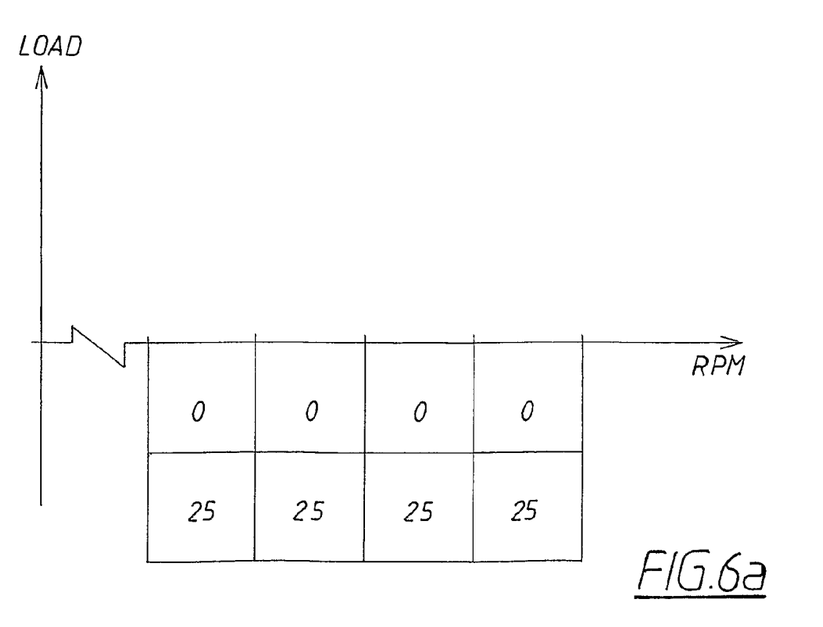
FIG. 6a demonstrates a matrix useable for determining the amount of fuel to be injected and the crank-angle position for injection during engine braking to regenerate the particle filter.

FIG. 6a shows an example of a matrix-formed image of the injected fuel amount. This matrix-shaped image is utilized when the internal combustion engine has assumed the engine braking function, and regeneration of the particle filter is about to take place. The control unit 22 comprises a memory area (not shown) in which a matrix of this shape is stored. In a first load interval, no fuel is supplied when engine braking. This first load interval corresponds to small negative values of the load of the internal combustion engine; i.e. when engine braking is carried out with a low engine braking effect which corresponds to the exhaust gases not being heated sufficiently. In one embodiment of the invention, this corresponds to an exhaust gas temperature below 250° C. In a second load interval, a small amount of fuel is supplied which essentially is in the same order of size as that supplied during zero load. In this second load interval, larger negative values on the load of the internal combustion engine correspond to engine braking being carried out at medium to high engine braking effect. In one embodiment of the invention, this corresponds to an exhaust gas temperature that exceeds 250° C., and preferably exceeds 450° C.

Figure 7:
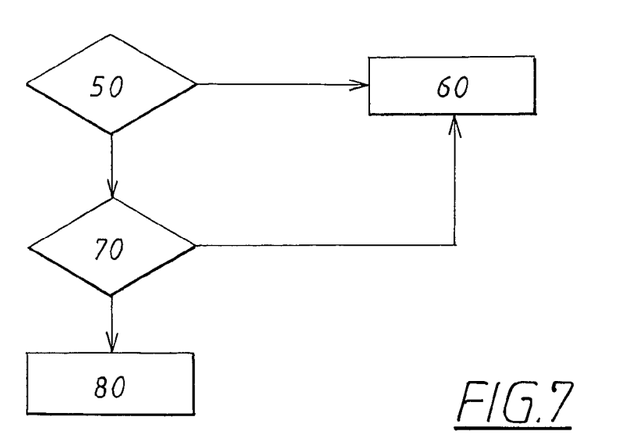
FIG. 7 is a flowchart representing the inventive method for regeneration of a particle filter by means of late injection of fuel when engine braking according to the present invention.

FIG. 7 shows an example of a flow chart for achieving the regeneration of a particle filter arranged in thermic connection to an oxidation catalyzer. In a first process step 50, it is determined whether or not the vehicle is in normal operation or if it is engine braking. If the vehicle is in normal operation, the control unit 22 assumes a first operational mode 60 where the fuel injection is controlled by a matrix-shaped image according to the example shown in FIG. 6. If engine braking is being carried out, a second process step 70 determines whether or not the particle filter should or should not be regenerated. If regeneration is not to take place, the control unit 22 again assumes a first operational mode 60 where the fuel injection is controlled by a matrix-shaped image according to the example shown in FIG. 6. Since engine braking is carried out, the regularly injected fuel amount, however, amounts to 0 mg/stroke. If regeneration is to take place, the control unit assumes a second operational mode 80 where regeneration takes place during engine braking. Fuel is in this case supplied according to a matrix-shaped image according to the example shown in FIG. 6a.

Figure 8:
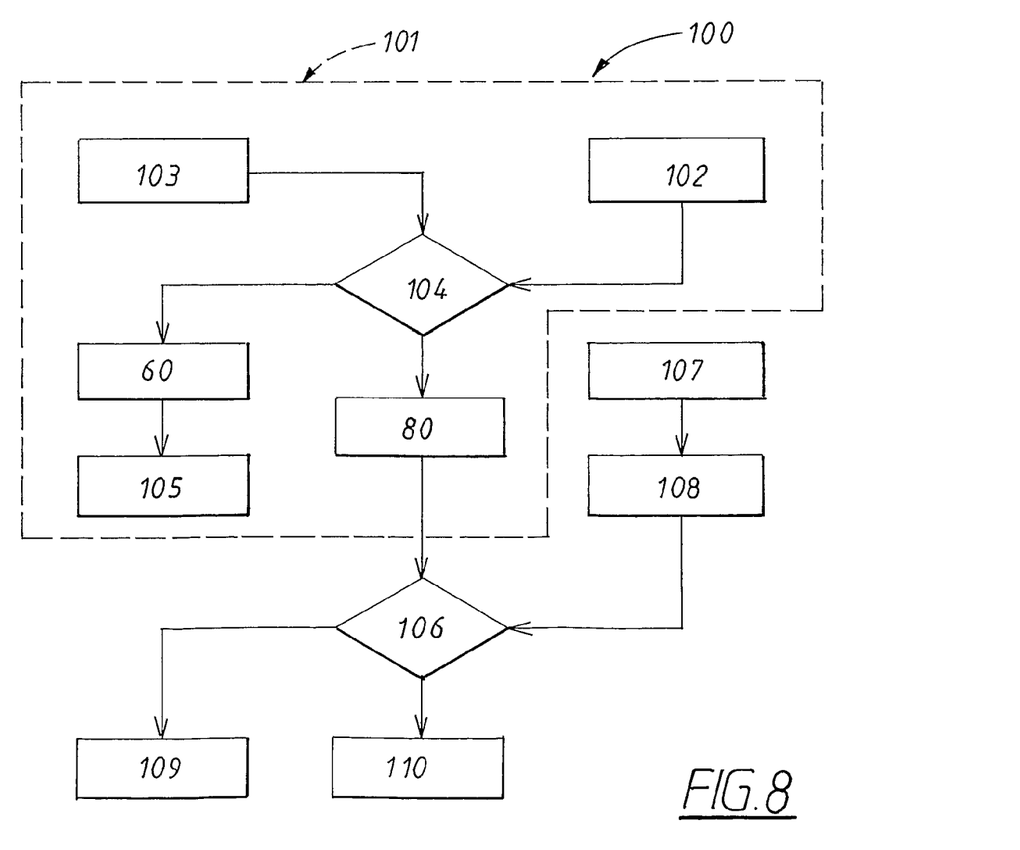
FIG. 8 is a flowchart representing a control algorithm for the regeneration of a particle filter.

FIG. 8 demonstrates an embodiment of a control algorithm 100 which is utilized by the control unit 2 of the vehicle. The control unit 22 comprises a conventional control algorithm 101 of a known kind which is intended to assume a first operational mode 60 in which the internal combustion engine is controlled to produce a torque, and a second operational mode 80 which corresponds to activation of the engine brake. For this purpose, the conventional control algorithm 101 comprises receiving or obtaining vehicle data such as speed, load pressure, temperature, engine rpm and the like. Exemplarily, the vehicle data is retrieved in a conventional manner both by means of a set of sensors and by means of calculated and estimated values based on information available. Retrieval of vehicle data is done in a first process step 102. Furthermore, such conventional control algorithm 101 contemplates retrieval of desired values requested by the driver such as gas pedal position, braking, adjusting of the braking effect of the retarder and/or engine brake, adjustment from an automatic speed control (cruise-control) and the like.

The retrieval of the requested values is carried out in a second process step 103. From the retrieved requested values and retrieved vehicle data, it is determined whether or not the internal combustion engine should work in its first or second operational mode in a first execution step 104. In the case of the first operational mode 60, corresponding to the production of a driving torque, according to known algorithms, calculation of duration and point in time for fuel supply is done in a third process step 105. If, in the case of the second operational mode 80 having been assumed, the control algorithm in a second execution step 106 assumes one of the modes regeneration or non-regeneration. Regeneration is carried out in the case that an input signal to the execution step 106 indicates that regeneration is to be carried out. The input signal is obtained from a sub-process 107 of the control algorithm 100, where an ongoing calculation of the soot level takes place. The calculation of the soot level is done by means of integration or summation of the soot addition from each instance of combustion of fuel in the combustion chambers, with a reduction of the soot amount which has been transformed via a nitrogen dioxide induced process and via enforced regenerations in ambient oxygen according to the invention. In one embodiment of the invention, the calculation of the soot amount S is done by means of the following equation:

$$S = \sum_{i=1}^{n} a_i V_i - \int b(T) dt - \sum_{j=11}^{m} c \Delta t_j$$

Figure 9:
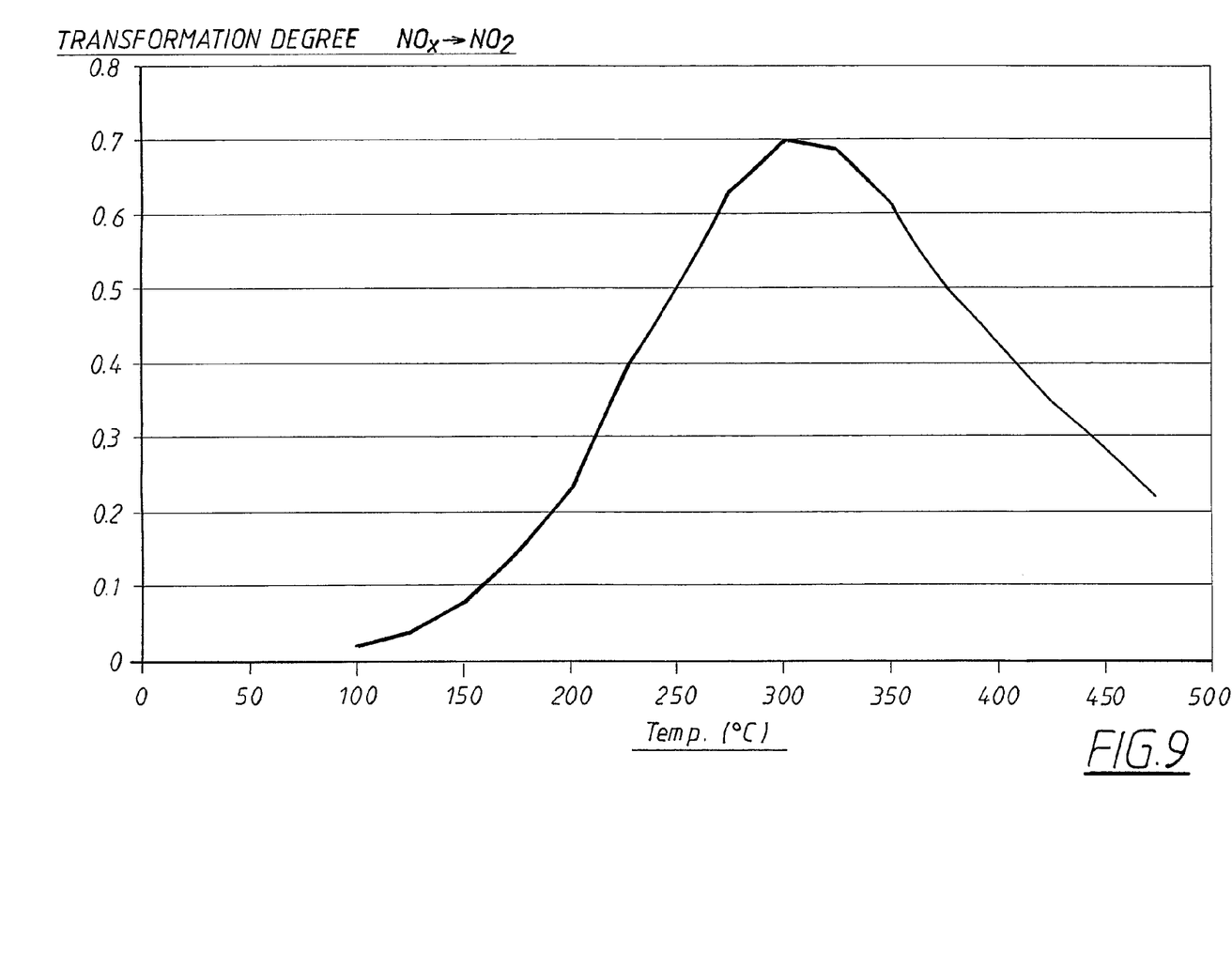
FIG. 9 is a graphical representation of the conversion degree of nitrogen oxide to nitrogen dioxide as a function of temperature, and thereby the efficiency of conversion of soot particles in the nitrogen dioxide ambience as a function of the exhaust gas temperature.

In this equation, "ai" is a soot formation factor for the combustion "i" with the volume of fuel "Vi". The soot formation factor is empirically known to those skilled in the field, and depends on the load point in the combustion process. Further, b(T) is a factor for combustion of soot particles in nitrogen dioxide ambience. The factor "b" is highly dependent on the temperature T of the exhaust gases in the oxidation catalyzer. The qualitative appearance of b(T) is known to those skilled in the field, and is apparent from the diagram shown in FIG. 9.

Still further in the equation, "c" is a factor for the above described oxygen supported transformation of soot particles; the character of "c" is known to those skilled in the field. The oxygen supported transformation only takes place for exhaust gas temperatures over 600° C. Within this area, the factor "c" is mainly proportional to the amount of oxygen in the exhaust gases and the soot concentration on the filter. The expression $\Delta t_j$ is the duration of the enforced regeneration. It should be appreciated that the equation is only valid for positive values of S; and if S is smaller than 0, S is given the value 0.

In a following process step 108, it is determined whether the soot amount S exceeds a threshold level $S \geq S_{max}$. If the soot level exceeds such a threshold value, the enforced regeneration at engine braking takes place by means of supply of fuel which is executed in a forth process step 109. The fuel amount is supplied either by means of a separately arranged injection unit which ends in the exhaust canal, or by means of supply via the ordinary injection unit of the internal combustion engine. The engine braking is obtained in a conventional way in a fifth process step 110, as has been described above.

It should be appreciated that the invention is not limited to the embodiments described above, but can be varied freely within the scope of the patent claims.

What is claimed is:

1. A method for regenerating a particle filter (13) arranged in thermic connection to a catalyzer unit (14) in an exhaust canal (10) connected to an internal combustion engine (2), and wherein the internal combustion engine (2) is arranged to assume a first operational mode (60) in which a driving torque is produced and a second operational mode (80) which constitutes engine braking, where the internal combustion engine (2) supplies a compression work to a gas mixture which flows through the internal combustion engine (2) and the exhaust canal (10) without a corresponding expansion work having been emitted from the gas mixture, said method comprising:

determining, using a control unit (22), that the internal combustion engine (2) is driven in the second operational mode (80) corresponding to engine braking with the temperature of the gas mixture in the exhaust canal rising;

supplying fuel, via an injection unit (21) to the exhaust canal (10) during the second operational mode (80); and exposing the catalyzer unit (14) to the fuel which is oxidized at the particle filter (13) which is heated to such a temperature that the soot particles are transformed to carbon dioxide under reaction with oxygen contained in the gas mixture.

2. The method as recited in claim 1, wherein the fuel is supplied directly to the exhaust canal (10) via an injection unit (21) arranged with the exhaust canal.

3. The method as recited in claim 1, wherein the fuel is supplied when an exhaust gas temperature at the particle filter has reached at least 250° C. because of engine braking.

4. The method as recited in claim 1, wherein the fuel is supplied when an exhaust gas temperature at the particle filter has reached at least 450° C. because of engine braking.

5. The method as recited in claim 1, wherein the fuel is supplied via said injection unit (21) which is arranged relative to said internal combustion engine (2) to supply fuel to a combustion chamber (37) thereof at a point in time that the fuel is allowed to pass the combustion chamber (37) into the exhaust canal (10) in a substantially non-spent state, with said substantially non-spent fuel being oxidized when coming into contact with the catalyzer unit (14), and by means of which the soot particle filter (13) is heated to the temperature that soot particles are transformed to carbon dioxide under reaction with oxygen contained in exhaust gases of the engine (2).

6. The method as recited in claim 5, wherein the fuel is supplied during one of an expansion stroke and exhaust stroke of the internal combustion engine.

7. A vehicle (1) comprising an internal combustion engine (2) and an exhaust system (10) connected to the internal combustion engine (2) and a particle filter (13) in thermic connection to a catalyzer (14) in said exhaust system (10) where the internal combustion engine (2) is equipped with members for engine braking (23) and by means of which the internal combustion engine (2) supplies compression work to a gas mixture which flows through the internal combustion engine (2) and the exhaust canal (10), but without expansion work having been emitted from the gas mixture, a control unit (22) is arranged with the internal combustion engine (2) and the engine (2) is configured to assume a first operational mode (60) where the internal combustion engine emits a driving torque and a second operational mode (80) constituting engine braking, an injection system (20,21) is arranged on said vehicle (1) so that in a case of need for regeneration of the soot particle filter (13), fuel is supplied to the exhaust canal (10) during the second operation mode (80), and by means of which the catalyzer unit (14) is exposed to the fuel which is oxidized, by means of which the soot particle filter (13) is heated to such a temperature that soot particles are transformed to carbon dioxide under reaction with oxygen comprised in said exhaust gases.

8. The vehicle as recited in claim 7, further comprising an injection unit (21) arranged with the exhaust canal to supply fuel directly thereto.

9. The vehicle as recited in claim 7, wherein the injection system (20,21) is connected to the internal combustion engine for the supply of fuel to combustion chambers (37) arranged in the internal combustion engine (2), with the injection system being arranged to supply fuel to said combustion chambers (37) in such a state that the fuel is allowed to pass the combustion chamber (37) into the exhaust canal in a non-spent or only partially spent state.

10. The vehicle as recited in claim 9, wherein the injection system (20,21) is arranged to supply fuel during the expansion stroke or the exhaust stroke of the internal combustion engine.

11. A method for the regeneration of a particle filter (13) arranged in thermic connection to a catalyzer unit (14) in an exhaust canal (10) connected to an internal combustion engine (2), where the internal combustion engine (2) is arranged to assume a first operational mode (60) in which a driving torque is produced and a second operational mode (80) which constitutes engine braking, where the internal combustion engine (2) supplies a compression work to a gas mixture which flows through the internal combustion engine (2) and the exhaust canal (10) without a corresponding expansion work having been emitted from the gas mixture, characterized in that the following steps are carried out:

a control unit (22) determines that the internal combustion engine (2) is driven in said second operational mode (80) corresponding to engine braking with the temperature of said gas mixture in the exhaust canal rising, an injection unit (21*a*-21*f*, 21*g*) supplies fuel to the exhaust canal (10) during said second operational mode (80), with said catalyzer unit (14) being exposed to said fuel which is oxidized with the particle filter (13) being heated to such a temperature that the soot particles are transformed to carbon dioxide under reaction with oxygen comprised in said gas mixture.

12. Method for regeneration according to claim 11, characterized in that fuel is supplied directly to the exhaust canal (10) via an injection unit (21*g*) arranged to the exhaust canal.

13. Method for regeneration according to claim 11, characterized in that fuel is supplied in those cases where the exhaust gas temperature at the particle filter by means of the engine braking effect is at least 250° C., preferably at least 450° C.

14. A method for regeneration of a particle filter according to claim 11, characterized in that said fuel is supplied by an injection unit (21*a*-21*f*) which is arranged to said internal combustion engine (2) which supplies fuel to a combustion chamber (37) in the internal combustion engine (2) at such a point in time that the fuel is allowed to pass the combustion chamber (37) into the exhaust canal (10) in a non-spent or only partly spent condition, with said spent or only partly spent fuel being oxidized when coming into contact with the catalyzer unit (14), by means of which the soot particle filter (13) is heated to such a temperature that soot particles are transformed to carbon dioxide under reaction with oxygen comprised in said exhaust gases.

15. Method for regeneration according to claim 14, characterized in that said fuel is supplied during the expansion stroke of the internal combustion engine or during its exhaust stroke.

16. A vehicle (1) comprising an internal combustion engine (2) and an exhaust system (10) connected to the internal combustion engine (2) and a particle filter (13) in thermic connection to a catalyzer (14) in said exhaust system (10) where the internal combustion engine (2) is equipped with organs for engine braking (23), by means of which the internal combustion engine (2) is arranged to supply a compression work to a gas mixture which flows through the internal combustion engine (2) and the exhaust canal (10) without a corresponding expansion work having been emitted from the gas mixture, with a control unit (22) arranged to the internal combustion engine (2) arranged to assume a first operational mode (60) where the internal combustion engine emits a driving torque and a second operational mode (80) constituting said engine brake, characterized in that an injection system (20,21) arranged to said vehicle (1) is arranged to, in case of need of regeneration of the soot particle filter (13), supply fuel to the exhaust canal (10) during said second operation mode (80), by means of which the catalyzer unit (14) is exposed to said fuel which is oxidized, by means of which the soot particle filter (13) is heated to such a temperature that soot particles are transformed to carbon dioxide under reaction with oxygen comprised in said exhaust gases.

17. A vehicle according to claim 16, characterized in that the vehicle comprises an injection unit (21*g*) arranged to the exhaust canal and being arranged to supply fuel directly to the exhaust canal (10).

18. A vehicle according to claim 16, characterized in that said injection system (20,21) consists of an injection system (20,21) connected to the internal combustion engine for the supply of fuel to combustion chambers (37) arranged in the internal combustion engine (2), with the injection system being arranged to supply fuel to said combustion chambers (37) in such a state that the fuel is allowed to pass the combustion chamber (37) into the exhaust canal in a non-spent or only partially spent state.

19. A vehicle according to claim 18, characterized in that said injection system is arranged to supply fuel during the expansion stroke or the exhaust stroke of the internal combustion engine.

* * * * *